(12) United States Patent
Osterling et al.

(10) Patent No.: US 7,646,751 B2
(45) Date of Patent: Jan. 12, 2010

(54) INTERFACE, APPARATUS, AND METHOD FOR COMMUNICATION BETWEEN A RADIO EQUIPMENT CONTROL NODE AND A REMOTE EQUIPMENT NODE IN A RADIO BASE STATION

(75) Inventors: Jacob Osterling, Järfälla (SE); Klas Sjerling, Bromma (SE); Franz Heiser, Järfälla (SE); Armin Splett, München (DE); Hans Kroner, München (DE); Peter Merz, München (DE); Werner Korte, München (DE); Rolf Kramer, legal representative, Walsrode (DE); Patrick Lagrange, Châteaufort (FR); Eric Georgeaux, Châteaufort (FR); Toshifumi Sato, Tokyo (JP); Yang Ganghua, Shanghai (CN); Lan Haiqing, Shanghai (CN); Lin Zhibin, Shanghai (CN)

(73) Assignees: Telefonaktiebolaget LM Ericsson (publ), Stockholm (SE); Siemens AG, Munich (DE)

( * ) Notice: Subject to any disclaimer, the term of this patent is extended or adjusted under 35 U.S.C. 154(b) by 287 days.

(21) Appl. No.: 10/572,367

(22) PCT Filed: Sep. 29, 2004

(86) PCT No.: PCT/IB2004/003170

§ 371 (c)(1),
(2), (4) Date: May 25, 2007

(87) PCT Pub. No.: WO2005/034544

PCT Pub. Date: Apr. 14, 2005

(65) Prior Publication Data

US 2008/0225816 A1 Sep. 18, 2008

(30) Foreign Application Priority Data

Sep. 30, 2003 (SE) .................. 0302596

(51) Int. Cl.
*H04B 7/216* (2006.01)
*H04W 72/00* (2009.01)
(52) U.S. Cl. ............... 370/335; 455/450; 455/562.1; 370/320; 370/395
(58) Field of Classification Search ............ 370/395.43, 370/466, 347, 73, 314, 280, 345, 337, 335, 370/320, 328; 455/450, 439, 561, 562, 517, 455/502, 196.1, 562.1, 422.1, 423, 447
See application file for complete search history.

(56) References Cited

U.S. PATENT DOCUMENTS 5,682,256 A * 10/1997 Motley et al. ............ 398/115

(Continued)

FOREIGN PATENT DOCUMENTS

EP 0 652 644 A2 10/1994

(Continued)

OTHER PUBLICATIONS

Obsai, "The Development and Benefits of and Open Base Station Architecture", Obsai White Paper, Mar. 13, 2003, pp. 1-15, XP002291842.

(Continued)

*Primary Examiner*—Lester Kincaid
*Assistant Examiner*—Kuo Woo
(74) *Attorney, Agent, or Firm*—Nixon & Vanderhye P.C.

(57) ABSTRACT

An interface, apparatus, and method are described for communication between a radio equipment control (REC) node and a radio equipment (RE) node in a radio base station that tranceives information over radio interface using multiple antenna carriers. The REC node is separate from and coupled to the RE node by a transmission link. Both control information and user information are generated for transmission over the transmission link from one of the REC node and the RE node to the other. Many advantageous interface features are described.

72 Claims, 13 Drawing Sheets

Basic frame structure for 2457.6 Mbit/s CPRI line bit rate

U.S. PATENT DOCUMENTS

| | | | |
|---|---|---|---|
| 5,870,392 A * | 2/1999 | Ann | 370/335 |
| 6,005,854 A * | 12/1999 | Xu et al. | 370/335 |
| 6,058,317 A | 5/2000 | Posti et al. | |
| 6,078,576 A * | 6/2000 | Schilling et al. | 370/347 |
| 6,434,137 B1 * | 8/2002 | Anderson et al. | 370/347 |
| 6,785,558 B1 * | 8/2004 | Stratford et al. | 455/561 |
| 6,930,990 B2 * | 8/2005 | Dajer et al. | 370/335 |
| 7,433,683 B2 * | 10/2008 | Dharia et al. | 455/422.1 |
| 2002/0141512 A1 | 10/2002 | Blanke | |

FOREIGN PATENT DOCUMENTS

| | | |
|---|---|---|
| EP | 0 652 644 A | 5/1995 |
| EP | 0 993 207 A | 4/2000 |
| WO | 95/05722 A | 2/1995 |
| WO | 2005/034544 | 4/2005 |

OTHER PUBLICATIONS

Chinese Office Action issued in corresponding Chinese Application No. 200480028557.0 mailed May 9, 2008.

International Search Report for International Application No. PCT/IB2004/003170 dated Feb. 11, 2005.

International Search Report for International Application No. PCT/GB94/01720 mailed Nov. 28, 1994.

International Search Report for International Application No. PCT/IB2005/003036 mailed Jan. 1, 2006.

International Preliminary Reporting in International Application No. PCT/IB2005/003036 mailed Dec. 11, 2006.

* cited by examiner

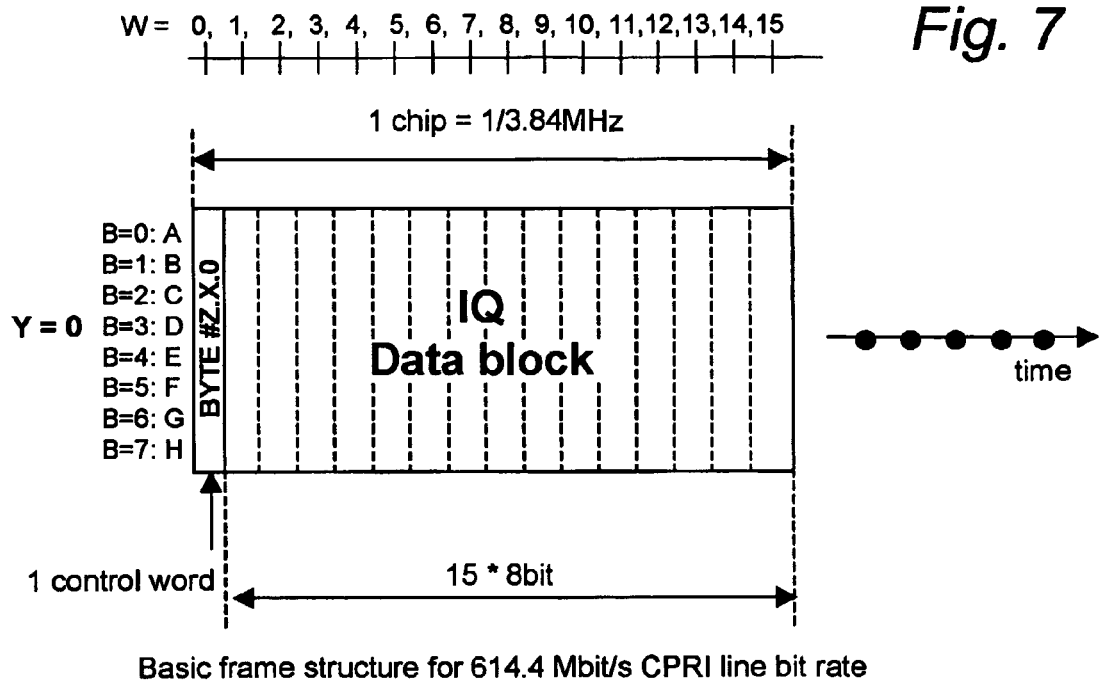
Basic frame structure for 614.4 Mbit/s CPRI line bit rate
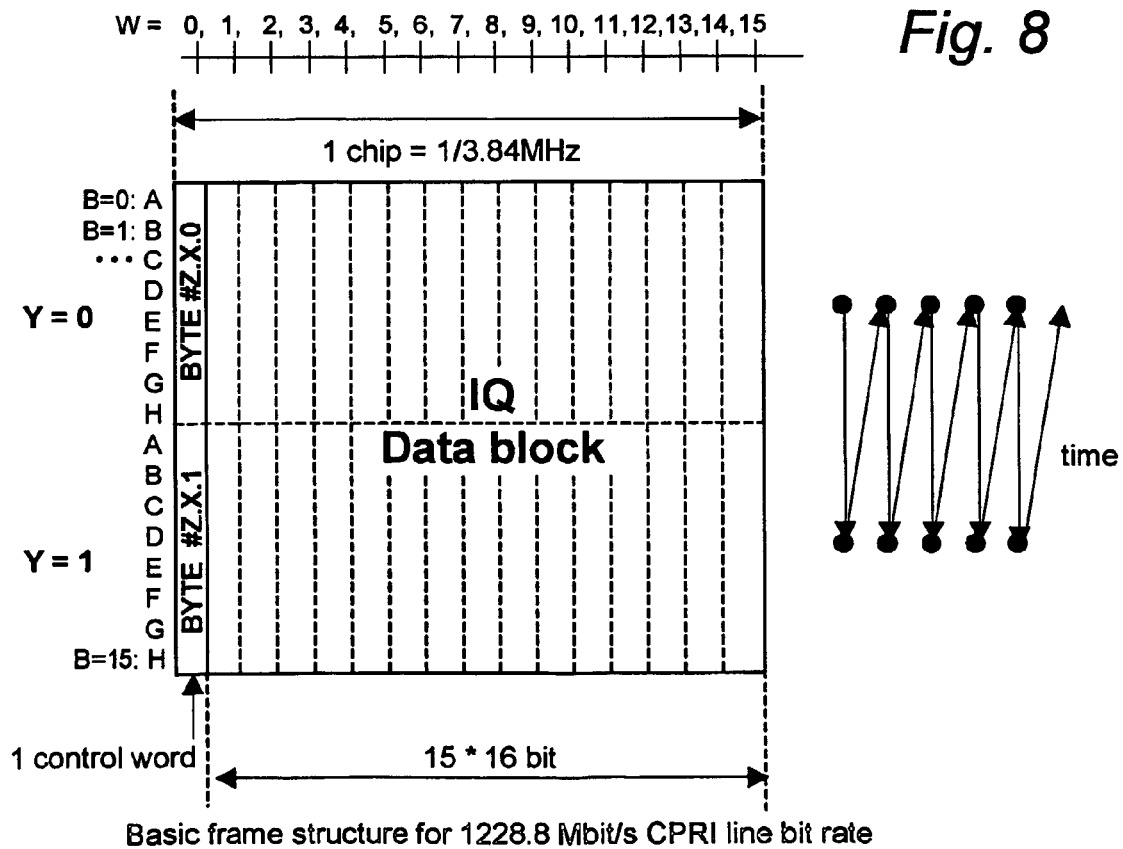
Basic frame structure for 1228.8 Mbit/s CPRI line bit rate Basic frame structure for 2457.6 Mbit/s CPRI line bit rate Illustration of subchannels within one hyperframe Illustration of control words and subchannels within one hyperframe

INTERFACE, APPARATUS, AND METHOD FOR COMMUNICATION BETWEEN A RADIO EQUIPMENT CONTROL NODE AND A REMOTE EQUIPMENT NODE IN A RADIO BASE STATION

RELATED APPLICATION

This application claims priority from Swedish provisional application number SE 0302596-2, filed on Sep. 30, 2003, entitled "Common Public Radio Interface," the contents of which is incorporated herein by reference.

TECHNICAL FIELD

The present invention is directed to distributed radio base stations where a base station includes a main baseband processing unit coupled to one or more remote radio units where RF processing occurs, and in particular, to the radio interface between the main baseband processing unit and the one or more remote radio units.

BACKGROUND AND SUMMARY

In a typical cellular radio system, wireless user equipment units (UEs) communicate via a radio access network (RAN) with one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a radio base station. A cell is a geographical area where radio coverage is provided by the radio equipment at a base station site. Each cell is identified by a unique identity, which is broadcast in the cell. The radio base stations communicate over the air interface with the user equipment units (UE) within range of the base stations. In the radio access network, several base stations are typically connected (e.g., by landline or microwave link) to a control node known as a base station controller (BSC) or a radio network controller (RNC). The control node supervises and coordinates various activities of connected plural radio base stations. The control node is typically connected to one or more core networks.

A conventional radio base station in a cellular communications system is generally located in a single location, and the distance between the baseband circuitry and the radio circuitry is relatively short, e.g., on the order of one meter. A distributed radio base station includes the radio equipment control (REC) and the radio equipment (RE). Both parts may be physically separated, (i.e., the RE may be close to the antenna, whereas the REC is located in a conveniently accessible site), or both may be co-located as in a conventional radio base station design. The radio equipment control (REC) performs baseband signal processing, and each radio equipment (RE) converts between baseband and radio frequencies and transmits and receives signals over one or more antennas. Each RE serves a certain geographic area, sector, or cell. Separate, dedicated optical and/or electrical links connect the radio equipment control (REC) to each of the plural remote radio equipment (RE). However, the term link as used hereafter refers to a logical link and is not limited to any particular physical medium. Each link carries digital information downlink from the REC to the RE and digital information uplink from the RE to the REC.

It would be desirable to have a standardized common interface between a REC and one or more REs. Such a standardized interface enables flexible and efficient product differentiation for radio base stations and independent technology evolution for the RE and REC. Such a standard would preferably define necessary items for transport, connectivity, and control including user plane data, control and management (C&M) plane transport mechanisms, and synchronization. Standardization would be particularly beneficial for hardware-dependent layers, e.g., physical layers, to ensure technology evolution on both sides of the interface with only a limited need for hardware adaptation. One advantageous result is that product differentiation in terms of functionality, management, and characteristics is not limited.

Other features that would be desirable to be supported by such an interface include:
Very high bandwidth utilization with the bandwidth supporting as many antenna-carriers as possible.
Very low delay (cable delay not included).
High-performance with respect to time and frequency distribution.
Flexible control and management signaling bandwidth.
Plug-and-play startup.
Flexible line bit rate
Flexible physical interface These features and others are achieved by an interface, apparatus, and method for communication between a radio equipment control (REC) node and a radio equipment (RE) node in a radio base station that transceives information over the radio interface using multiple antenna-carriers. The REC node is separate from and coupled to the RE node by a transmission link. Both control information and user information are generated for transmission over the transmission link from one of the REC node and the RE node to the other. The user information includes multiple data flows. Each data flow corresponds to data associated with one antenna per one radio carrier. The control and user information are formatted into multiple time division multiplexed (TDM) frames. Each basic TDM frame includes a control time slot for the control information and multiple data time slots for the user information. Each data time slot corresponds to a data flow of one of the antenna carriers. The frames are then transmitted over the transmission link to the other node. In an example implementation in a wideband code division multiple access (CDMA) environment, the time period of the frame corresponds to one CDMA chip time period.

Each antenna carrier has a corresponding time slot in the frame so that the data samples for each antenna carrier are inserted in the antenna carrier's corresponding time slot. The corresponding time slot position in the frame may be fixed or it may be variable. The control information includes multiple different control flows, and a portion of them is included in the control time slot. The different control flows may include, for example, four control flows: radio interface and timing synchronization information, control and management (C&M) information, layer 1 (L1) control information, and extension information. The control and management information includes both fast and slow control and management information; and the L1 signaling indicates the bit rate of both.

The control time slots may be arranged into 64 subchannels. Each such subchannel corresponds to every $64^{th}$ control time slot. The 64 subchannels may then be allocated to carry the four control flows. Multiple basic frames may be combined into a hyperframe, and multiple hyperframes may be combined into a radio frame. One or more borders of the hyperframe are used to map each control time slot to a respective assigned subchannel. Each of the four control words within a hyperframe carries one subflow of a control flow.

The control information includes a known symbol for use in obtaining synchronization between the REC and the RE. The synchronization includes detecting the known symbol to retrieve one or more hyperframe borders. The known signal is periodically provided, and synchronization is obtained without requiring a feedback signal be sent in response to detecting the known signal. In one, non-limiting example implementation, the known signal is a K28.5 symbol.

Start-up communication between the REC and the RE include negotiations of one or more characteristics for the transmission link. The negotiations begin with the REC sending transmissions over the interface, with each transmission using one of several different line bit rates. The RE attempts to detect the line bit rate of each such transmission. If the RE detects one of the REC transmissions, then the RE replies to the REC using the same line bit rate. Similarly, one or both of the REC and RE transmit a highest, supported bit rate for one or more control and management flows. The node with the highest control and management bit rate adopts the highest rate supported by the other node. Alternatively, the REC proposes a lower C&M bit rate. A similar back-and-forth negotiation occurs with respect to the highest supported version of the REC-RE interface communications protocol.

Another feature includes calibrating or compensating for a transmission time delay associated with the transmission link/internal interface. More specifically, the RE obtains an RE time difference between when a frame structure is received from the REC and when the frame structure is transmitted to the REC. Similarly, the REC determines an REC time difference between when a frame structure is received from the RE and when the frame structure is transmitted to the RE. A round-trip delay is determined by subtracting the RE time difference and the REC time difference.

These and other features and advantages are further described in connection with the figures and the detailed description.

BRIEF DESCRIPTION OF THE DRAWINGS

FIG. 7 shows a basic frame structure for a particular, example CDMA chip period and CPRI line bit rate;

FIG. 8 shows a basic frame structure for a particular, example CDMA chip period and higher CPRI line bit rate;

DETAILED DESCRIPTION

The following description sets forth specific details, such as particular embodiments, procedures, techniques, etc., for purposes of explanation and not limitation. But it will be appreciated by one skilled in the art that other embodiments may be employed apart from these specific details. For example, although the following description is facilitated using non-limiting examples, the present invention may be employed to in any type of radio communications system where base stations are used. In some instances, detailed descriptions of well-known methods, interfaces, circuits, and signaling are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
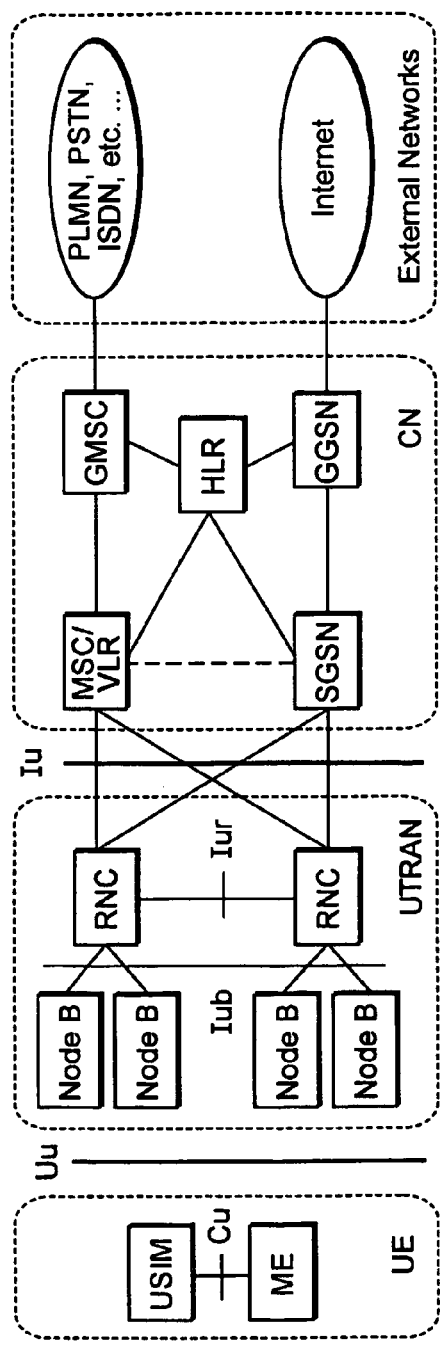
FIG. 1 illustrates a UMTS system that includes several node B or radio base stations.

Because of certain data handling limitations of second generation cellular telecommunication systems, such as GSM, third generation systems were developed to provide high bit rate services that enable, for example, high quality images and video to be transmitted and received and to provide access to, the worldwide web with high data rates. These third generation mobile communication systems are referred to as universal mobile telecommunication systems (UMTS). Wideband code division multiple access (WCDMA) is the main third generation access technique used for communications over the radio/air interface. UMTS systems include logical network elements that each have a defined functionality. FIG. 1 shows an example UMTS system. Network elements are grouped into the radio access network (RAN), sometimes as referred to as the UMTS Terrestrial RAN (UTRAN), that handles all radio-related functionality, and the core network (CN) which is responsible for switching and routing calls and data connections to external networks such as PSTN, ISDN, PLMN, and the Internet. The UTRAN covers a graphical area which is divided into cell areas, each cell area being served by a radio base station. A cell is a geographical area where radio coverage is provided by the radio equipment. The user equipment (UE) interfaces the user and the radio/air interface.

Figure 3:
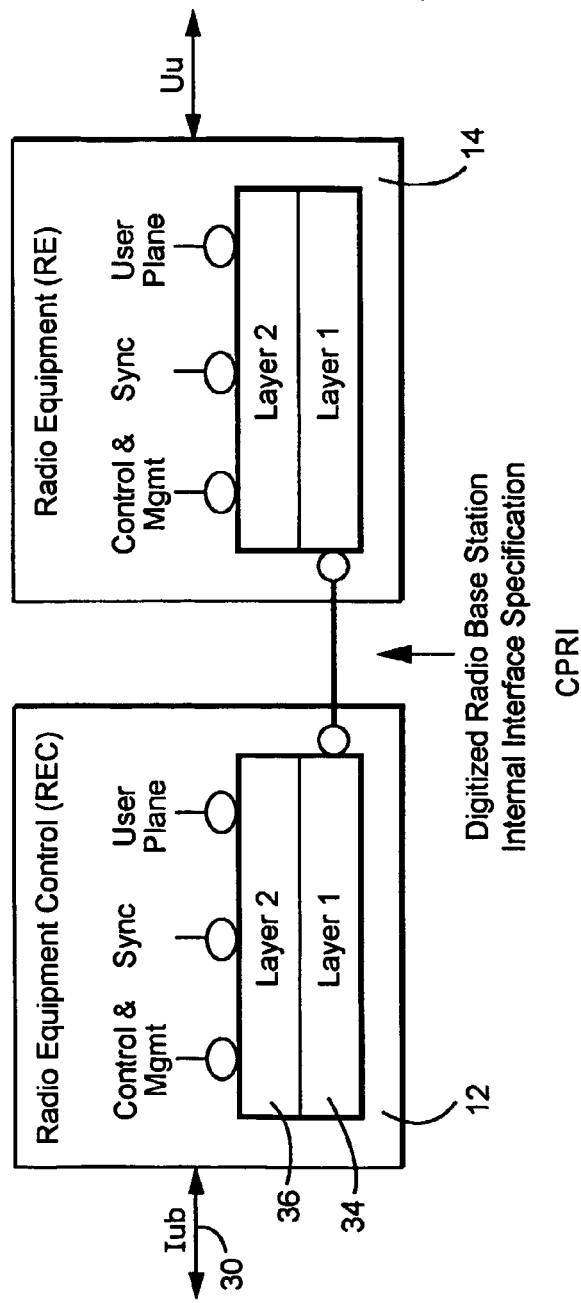
FIG. 3 illustrates CPRI between the REC/RE and various information flows or planes.

The following description focuses on the node B which converts the data flow between the Iub interface and the radio/air interface Uu. The internal interface within the radio base station which links the REC to one or more REs is referred to herein as the common public radio interface (CPRI) as shown in FIG. 3. Even though a public interface is envisioned, the CPRI interface could be used as a private interface. The following description is based on UMTS nomenclature, but is not limited just to UMTS systems, but instead, may be employed-in any distributed radio base station.

Figure 2A:
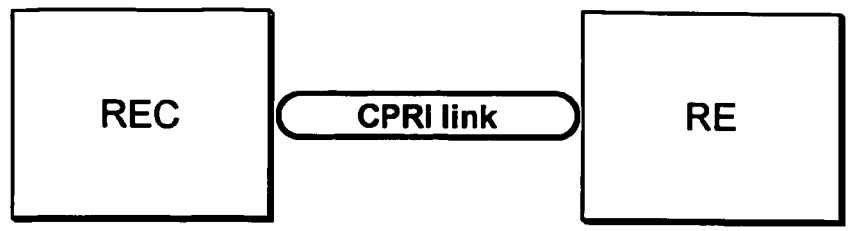
FIGS. 2A-2C illustrate some non-limiting, example REC/RE topologies.
Figure 2B:
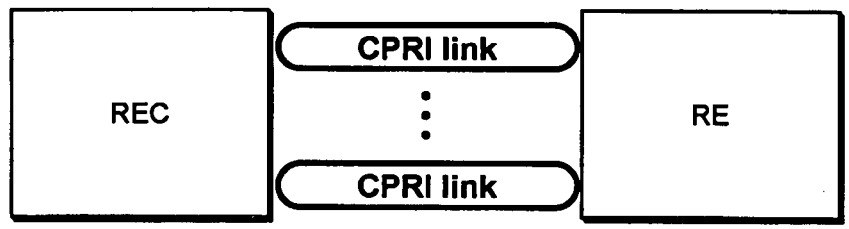
Figure 2C:
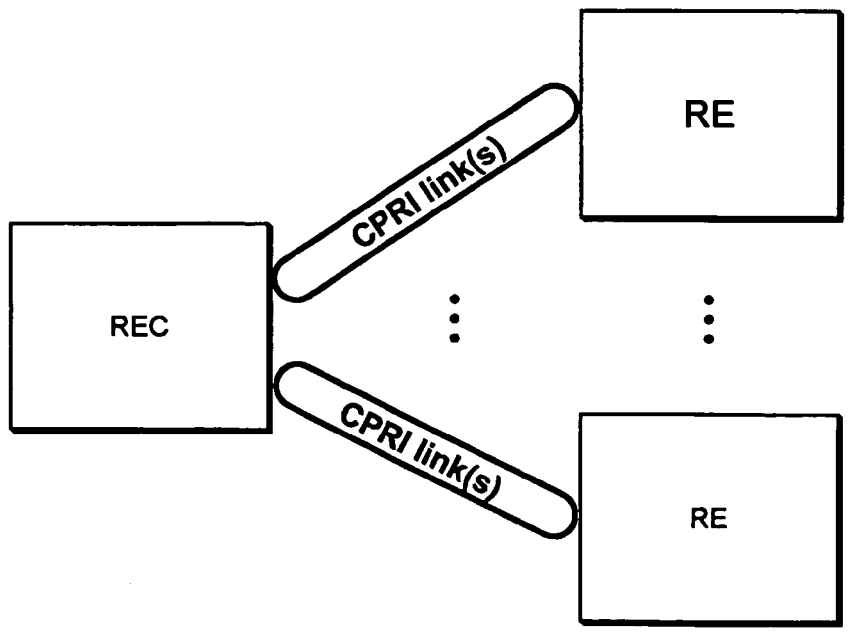

FIG. 2A shows a point-to-point CPRI link between one REC and one RE. FIG. 2B illustrates multiple, point-to-point CPRI links between one REC and RE, and FIG. 2C illustrates multiple, point-to-point CPRI links between one REC and several REs. Although FIG. 2C shows a "star" topology, other topologies could be used, e.g., the REC and REs could be coupled in a cascade configuration with several REs.

The radio equipment control (REC) node provides access to the Radio Network Controller via the Iub interface in a UMTS radio access network, whereas the radio equipment (RE) node serves as the air interface to the user equipment (in the UMTS network the air interface is called the Uu interface). The REC performs the radio functions of the digital baseband domain, whereas the RE performs the analog radio frequency (RF) functions. The functional split allows a generic CPRI interface based on In-phase and Quadrature (IQ) complex data can be defined. Continuing with the non-limiting UMTS example, the REC is concerned with the Iub transports, the radio base station control and management, and the digital baseband processing. The RE provides the analog and radio frequency functions such as filtering, modulation, frequency conversion, and amplification. An overview of the functional separation between the REC and RE for the UMTS FDD standard is shown in Table 1.

sion multiplexing of different data flows, and low level signaling. Layer 2 defines media access control, flow control, and data protection of the control and management information flow. There are multiple protocol planes or flows. A control plane includes control information used for call processing. A synchronization plane transfers synchronization and timing information between the REC and the RE. A management plane includes management information for the operation, administration, and maintenance of the CPRI interface and the RE. The user plane includes user data that must be transferred from the radio network station to the user equipment and vice versa.

The user data are transferred in the form of complex data, referred to herein as IQ data, where "I" corresponds to the real or In-phase component of the complex signal and "Q" corresponds to the imaginary or Quadrature component of the complex signal. Several IQ data flows may be sent via one physical CPRI link, and each IQ data flow reflects the data of one antenna for one carrier, which is referred to as an antenna-carrier (AxC). One AxC is associated with the amount of digital user data for either reception or transmission of one carrier, e.g., a UTRA-FDD carrier at one independent antenna element. Stated differently, the AxC is the data to be transmitted on a specific frequency on a specific antenna. Since the CDMA method is used in this description, each AxC contains the information for multiple UEs superimposed on each other. In the example embodiment, the AxC "container" or time slot contains the user data (e.g., IQ samples) of the one AxC for one UMTS chip duration.

TABLE 1

| Functions of REC | | Functions of RE | |
|---|---|---|---|
| Downlink | Uplink | Downlink | Uplink |
| Radio base station control & management | | | |
| Iub transport | | RRC Channel Filtering | |
| Iub Frame protocols | | D/A conversion | A/D conversion |
| Channel Coding | Channel De-coding | Up Conversion | Down Conversion |
| Interleaving | De-Interleaving | ON/OFF control to each carrier | Automatic Gain Control |
| Spreading | De-spreading | Carrier Multiplexing | Carrier De-multiplexing |
| Scrambling | De-scrambling | Power amplification and limiting | Low Noise Amplification |
| Adding of physical channels | Signal distribution to signal processing units | Antenna supervision | |
| Transmit Power Control of each physical channel | Transmit Power Control & Feedback Information detection | RF filtering | RF filtering |
| Frame and slot signal generation (including clock stabilization) | | | |
| Measurements | | Measurements | |

Figure 4:
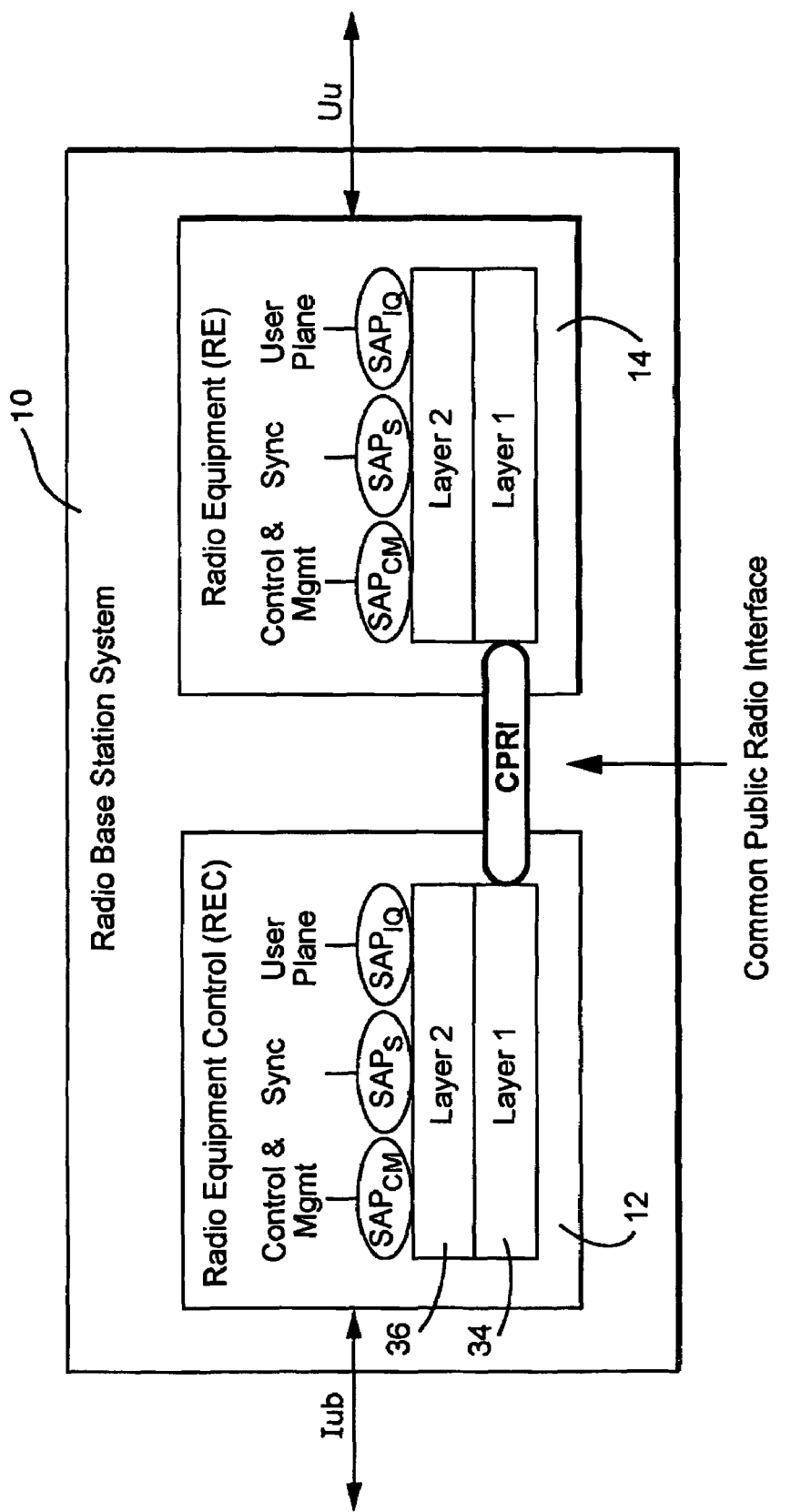
FIG. 4 is similar to FIG. 3 and includes services access points.

In addition to the user plane data (IQ data), control and management (C&M) control signals as well as synchronization control signals are exchanged between the REC and the RE. All information streams or "planes", including both control and user data, are multiplexed onto a digital serial communication line using layer 1 and layer 2 protocols. See FIG. 3. The different information flows have access to the layer 2 via appropriate service access points (SAPs), as shown in FIG. 4.

The protocols for the physical layer (layer 1), and the data link layer (layer 2) are defined by the CPRI. Layer 1 defines electrical characteristics, optical characteristics, time divi- Layer 2 service access points (SAPs) are defined for the information planes or data flows and are used as reference points for performance measurements. These service access points shown in FIG. 4 are denoted as $SAP_{CM}$, $SAP_S$, and $SAP_{IQ}$. The downlink direction is from the REC to RE, and the uplink direction is from the RE to the REC.

Figure 5:
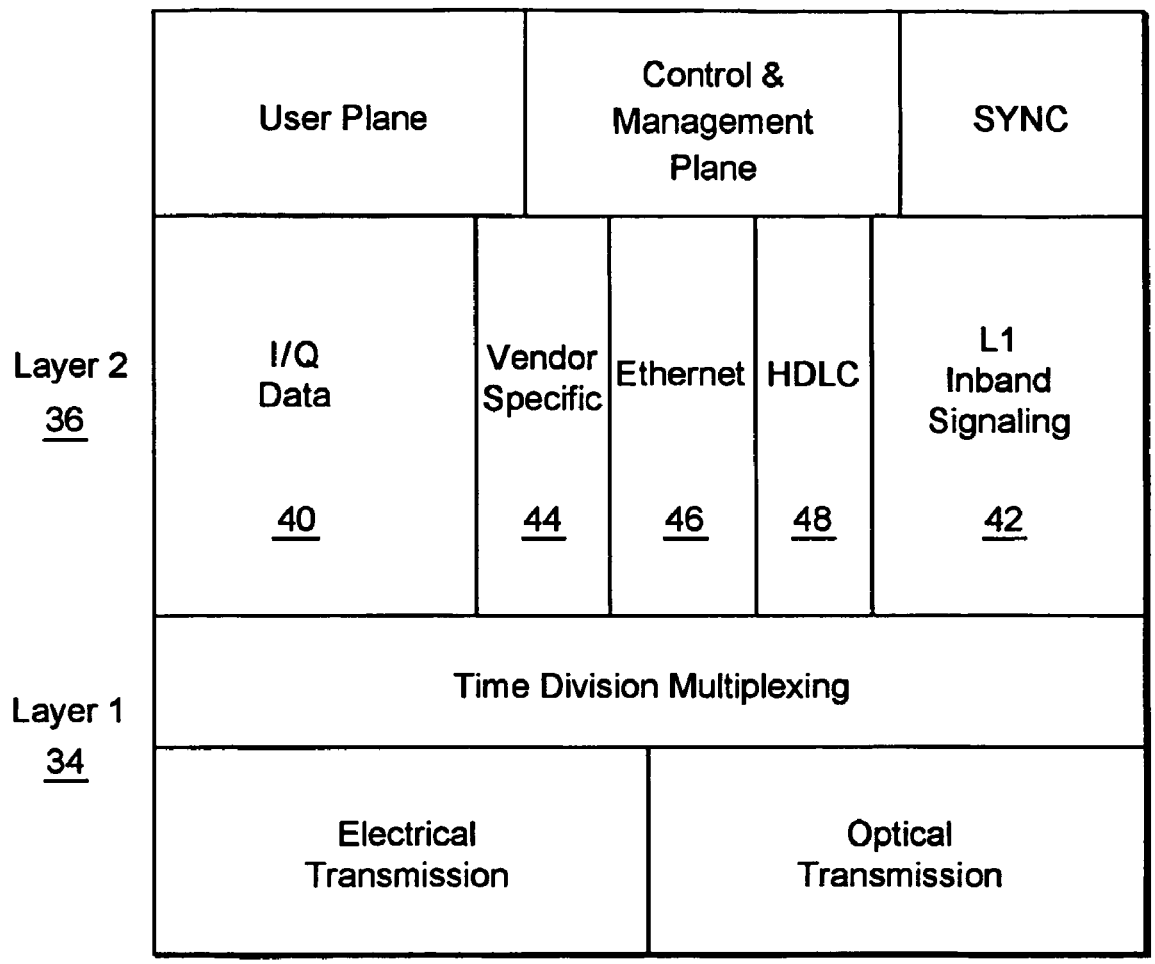
FIG. 5 shows a CPRI protocol overview.

FIG. 5 illustrates an overview of the CPRI protocol for the physical layer 34 (layer 1) and the data link layer 36 (layer 2). Layer 1 defines, e.g., electrical characteristics, optical characteristics, time division multiplexing of the different data flows, and low level signaling. Layer 2 defines the media access control, flow control, and data protection of the control and management information flow. The control plane involves control data flow used for the user plane control. The RE does not "know" anything about different calls being set up or released. The control plane typically sets the frequency and output power per AxC and reads measurements per AxC. The management plane carries management information for the operation, administration, and maintenance of the CPRI link and the radio equipment. The control and management data is exchanged between control and management entities in the radio equipment controller 12 and radio equipment 14 and is provided to higher protocol layers. The control and management plane is mapped to a single control flow over the CPRI link.

The user plane includes data to be transferred from the radio base station to the user equipment and vice versa. As the method above, the user plane IQ data is represented by block 40 in FIG. 5. Several IQ data flows may be sent via one physical CPRI link, and again, each IQ data flow corresponds to the data for one antenna-carrier (AxC).

The synchronization plane transfers synchronization and timing information between radio equipment controller 12 and radio equipment 14. Synchronization data is used for encoding (e.g., 8B/10B encoding) performed in the SERDES (Serializer/Deserializer) 76 and 86 shown in FIG. 6. The synchronization data is needed to align the deserializer at the receiving end to the serializer at the transmitting end. Synchronization data is also used to detect chip, hyperframe, and radio frame boundaries, and associated frame numbering as described below. The in-band signaling, depicted by block 42 in FIG. 5, includes information that is related to the physical REC/RE link for system startup, layer 1 link maintenance, and time critical information that has a direct time relationship to layer 1 user data. Block 44 represents an information flow reserved for vendor-specific information.

The IQ data of different antenna carriers are multiplexed by a time division multiplexing (TDM) scheme onto transmission links. The Control and Management (C&M) data are either sent as inband signaling (for time critical signaling data) or by layer 3 protocols that reside on top of appropriate layer 2 protocols. Two different layer 2 protocols—High Data Level Link Control (HDLC) 46 and Ethernet 48 are supported by the CPRI. The control and management data and the synchronization information are time-multiplexed with the IQ data.

Figure 6:
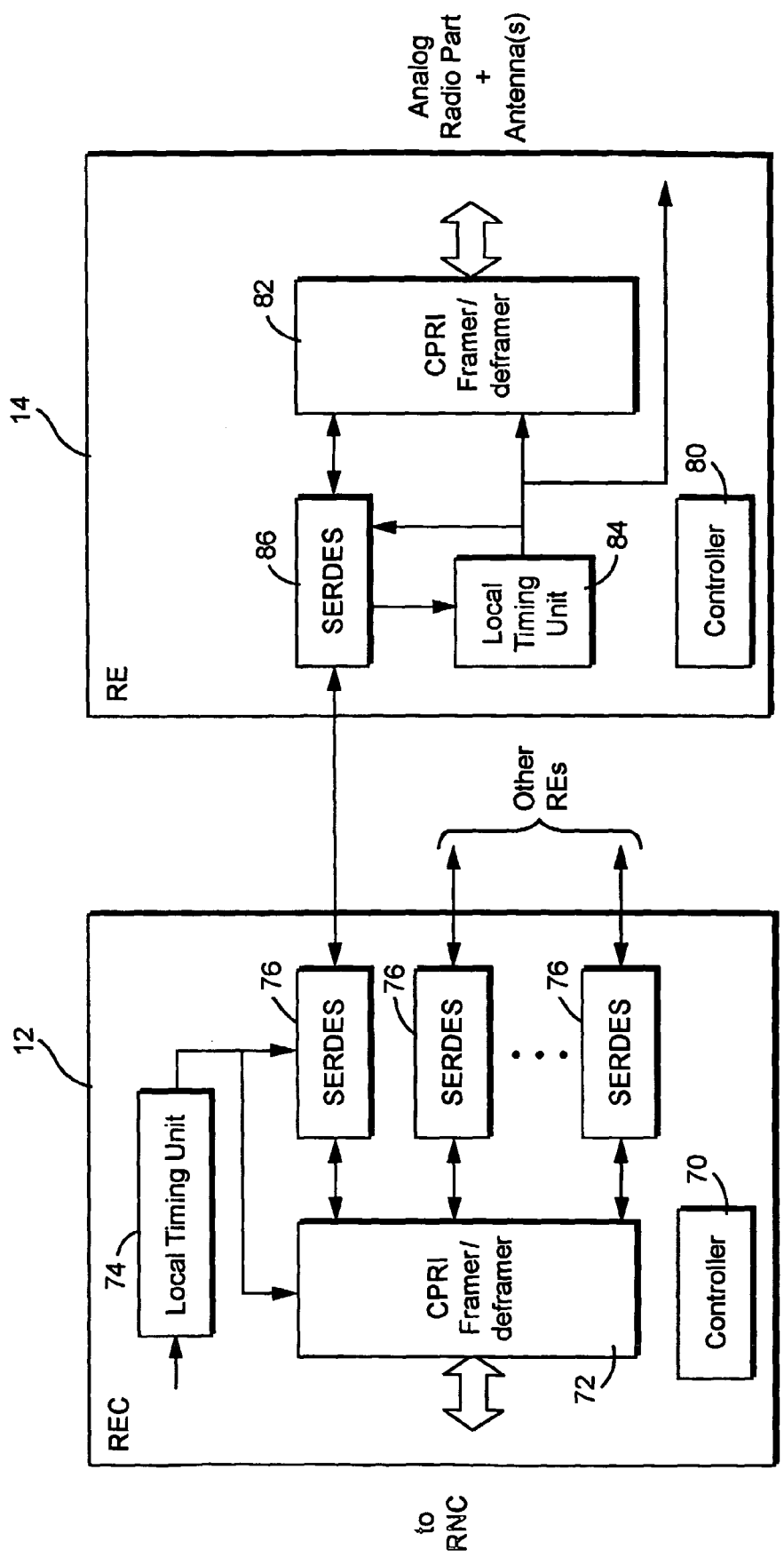
FIG. 6 is a function block diagram showing certain functional elements in each of the REC and RE.

FIG. 6 illustrates the REC and RE nodes in further detail. The REC node 12 is managed by a controller 70, e.g., a CPU. A framer/deframer unit 72 is coupled to the controller 70. Each data flow corresponding to the data for one antenna of one carrier, i.e., one antenna-carrier (AxC), is provided to the framer 72 which multiplexes all data flows/AxCs, control and management information, synchronization information and layer one (L1) information into a particular frame structure, which is described in more detail below. The frame structure for a particular RE is then provided to a serializer/deserializer unit (SERDES) 76 corresponding to this RE 14, and the SERDES 76 generates a serial stream on an output port (not shown) corresponding to that RE 14. Similarly, information from each RE is received on an input port (not shown), deserialized by SERDES 76, (i.e., put into parallel form), and provided to the deframer 72. The deframer 72 extracts and distributes to the appropriate SAP, the data flow, controller management, and layer 1 timing and maintenance information. A local timing unit 74 provides frequency and time references for the REC 12.

The RE 14 has a similar structure and is managed by a controller 80, e.g., a CPU. The controller 80 is coupled to a CPRI framer/deframer 82. The framer/deframer is coupled to one or more antenna elements, where each antenna element receives a corresponding data flow. The framer/deframer 82 extracts control and management data and layer 1 maintenance data received from the REC 12 by way of the serializer/deserializer 86 and provides it to the controller 80 over a control link not shown. The framer/deframer 82 also combines control management data, layer 1 data, timing data provided by the local timing unit 84, and data flow information in a frame structure and provides the frame structure to the REC in serial form via the serializer/deserializer 86. The data flow information is received from the analog radio part of the RE 14 for multiplexing into the basic frame structure.

The REC 12 regularly transmits a "time mark," generated by the REC's local timing unit 74, over the CPRI links that can be readily detected and recognized by each RE 14. The time mark at the outgoing or incoming interface port is used to relate time to a unique carrier instant on the interface. In the example implementation, the time mark is a K28.5, 10-bit symbol that is sent every ten milliseconds by the REC 12. When the time mark is received by the RE 14, the RE's local time unit 84 is set to a predetermined value, e.g., zero. In this way, the local time unit 84 is synchronized by "slaving" it to the timing mark generated by the REC's local timing unit 74.

Figure 9:
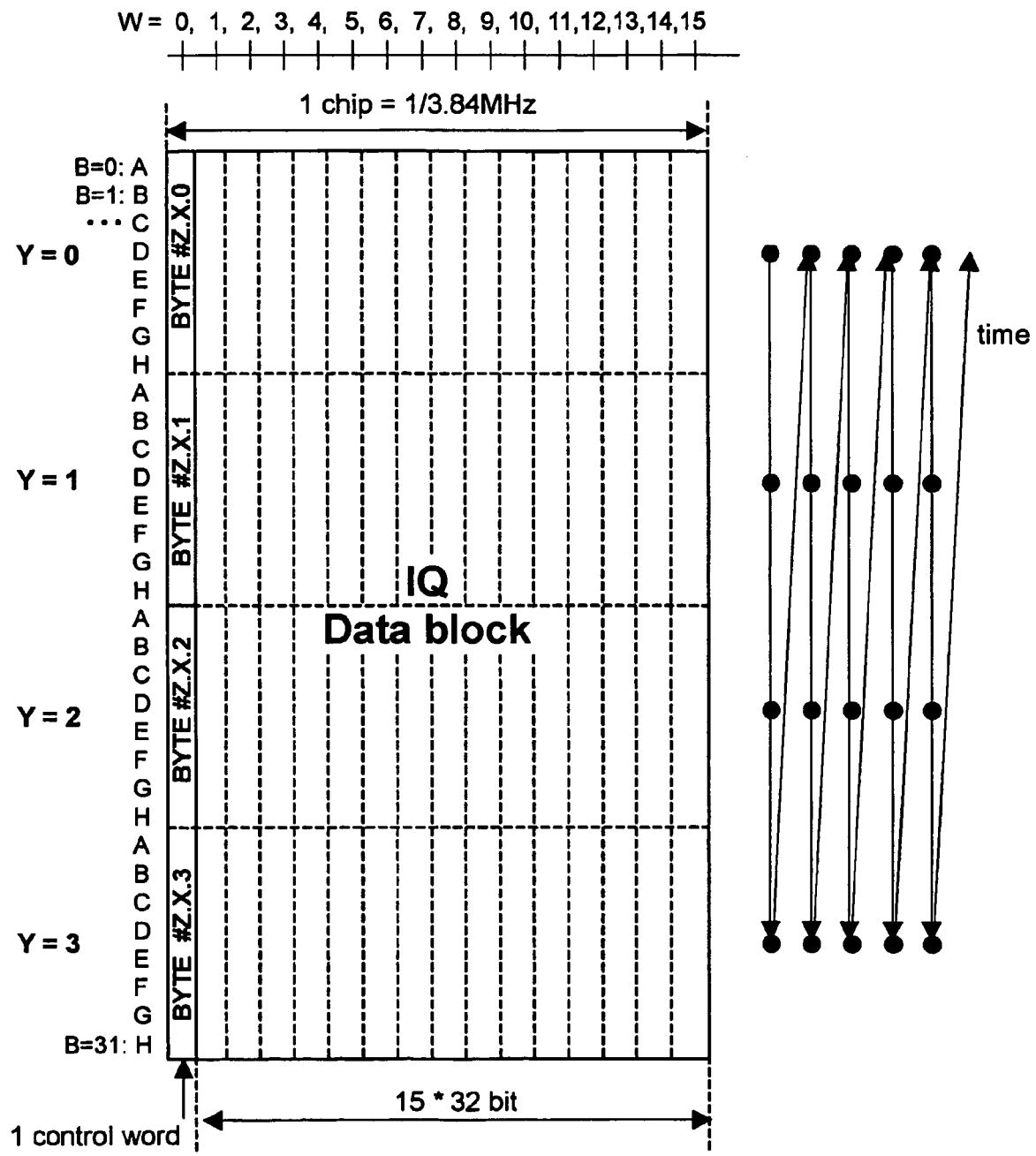
FIG. 9 shows a basic frame structure for a particular, example CDMA chip period and still higher CPRI line bit rate.

The TDMA information is carried over the CPRI interface in frames. In the non-limiting example implementation, the length of a basic frame illustrated in FIG. 7 is 1 WCDMA chip period→Tchip=1/3.84 MHz=260.416667 ns. A basic frame consists of 16 words with index W=0 . . . 15. The word with the index W=0 is used as a control word (CW). The remaining words (W=1 . . . 15), $15/16$ of the basic frame are dedicated to the user plane IQ data shown in the figure as the IQ data block. The word length T depends on the total data rate, which is referred to as the CPRI line bit rate. Three alternative data rates, each with differing word lengths are available: 614.4 Mbit/s (length of word T=8); 1228.8 Mbit/s (length of word T=16), shown in FIG. 8; and 2457.6 Mbit/s, (length of word T=32) shown in FIG. 9.

Each word corresponds to an 8-bit byte. Each bit within a word in FIG. 7 can be addressed with the index B, where B=0 is the least significant bit and B=T−1 is the most significant bit. Each bit within a word in FIGS. 8 and 9 can be addressed with the index Y, where B=0 is the least significant bit of Y=0, B=7 is the most significant bit of Y=0, B=8 is the least significant bit of Y=1, etc. The transmission sequence of the bits is indicated on the right-hand side of FIGS. 7 to 9 with each ball representing a bit. After 8B/10B encoding, the ten code groups ("ABCDEI FGHJ") are transmitted as a serial data stream with bit "A" first. In 8B/10B encoding, one encoding bit is added to the three most significant bits, and another encoding bit is added to the five least significant bits.

Figure 10:
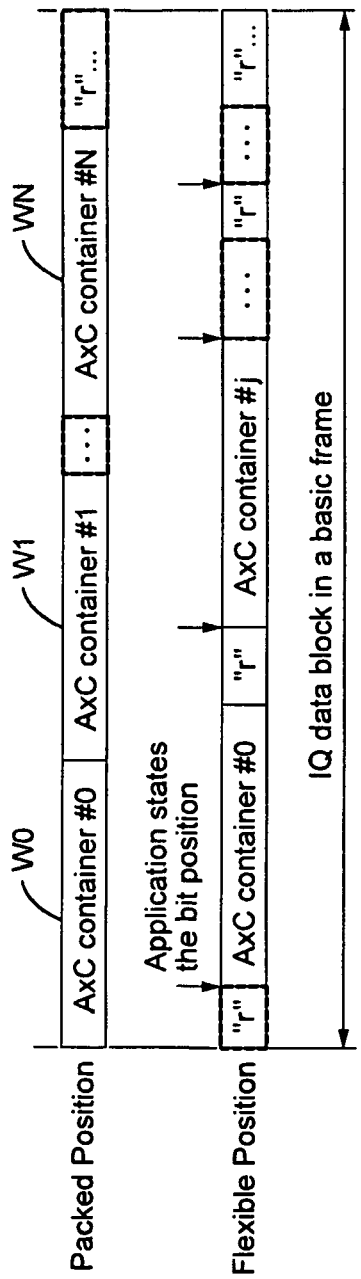
FIG. 10 shows packed and flexible multiplexing configurations for the frame structure.

An AxC container carries an IQ data block in the basic frame. It contains N IQ samples from the same AxC, where N is the oversampling ratio. IQ sample(s) are sent in an AxC container in accordance with either a "packed position" or a "flexible position" in the basic frame. Both are illustrated in FIG. 10. In the packed position, each AxC container in the basic frame is sent consecutively without any reserved bits in between and in descending order of AxC number. For the flexible position, a higher level application decides at what address in the IQ data block the first data bit of the AxC container will be positioned. Bits not used by an AxC container may be treated as reserved bits "r."

Figure 11:
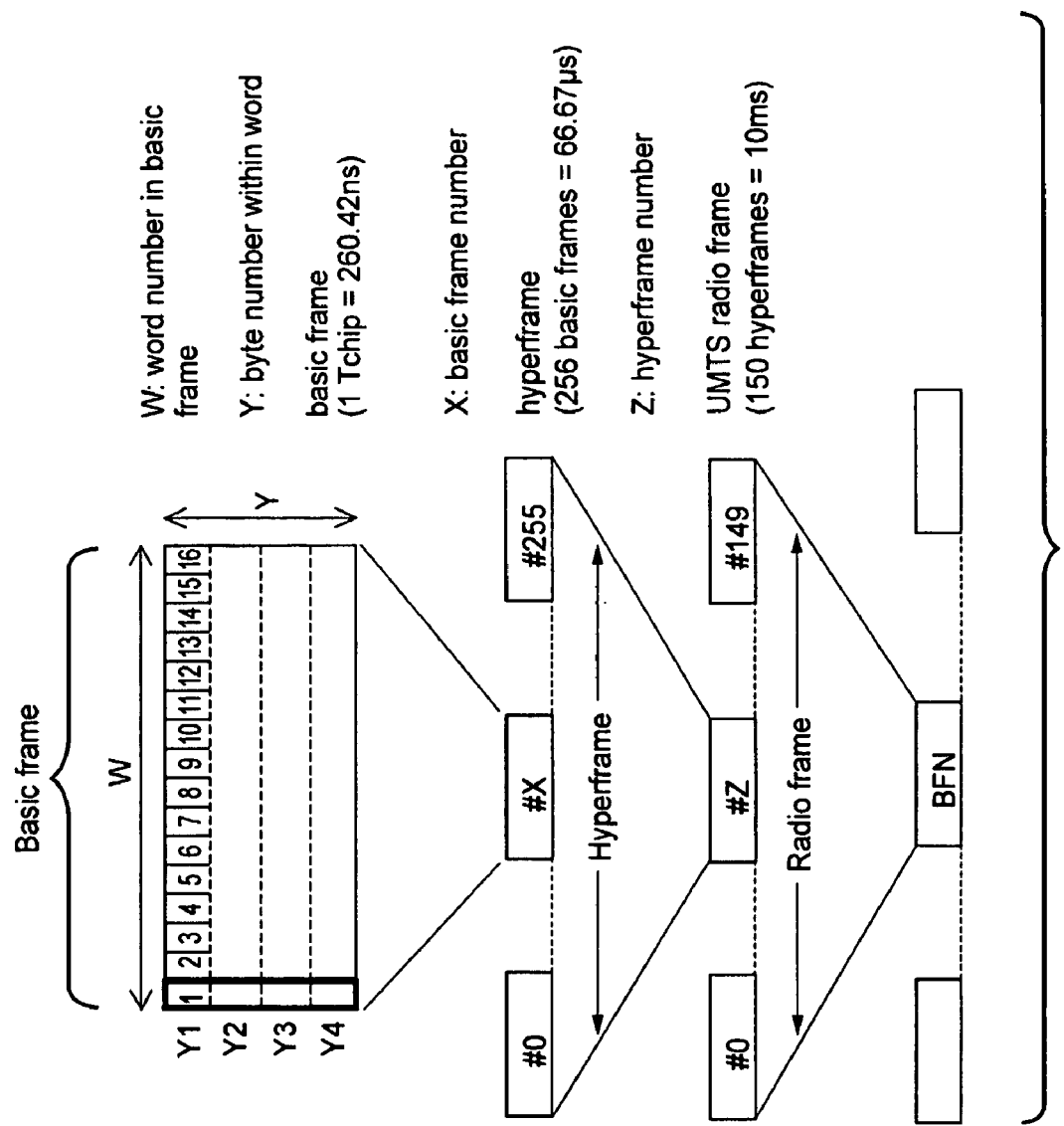
FIGS. 11A and 11B show the relationship between the basic frame, the hyperframe, and the UMTS radio frame in one, non-limiting, example embodiment.

FIG. 11 illustrates a hyperframe structure which is hierarchically embedded between the basic frame and the UMTs radio frame. "W" represents the word number in the basic frame, and "Y" represents the byte number within each word. Again, in this example implementation, the basic frame corresponds to a single chip period in UMTS. A hyperframe includes 256 basic frames, with the hyperframe number being designated by the variable X. 256 basic frames in the example implementation corresponds to 66.67 microseconds. 150 hyperframes are packed into a single UMTS radio frame, and in the example implementation, the UMTS frame is 10 milliseconds. Each hyperframe number is represented by the variable "Z." The hyperframe structure is used to multiplex the different control flows (and sub flows thereof) onto the control time slot. The smallest (in terms of bit rate) specified control flow is one control time slot per hyperframe. An example of a smallest control flow is the timing marker of the synchronization alignment flow (e.g., a K28.5 symbol). The choice of 256 basic frames as one hyperframe provides fine granularity in the allocation of bandwidth to different control flows and also simplifies implementation.

Figure 12:
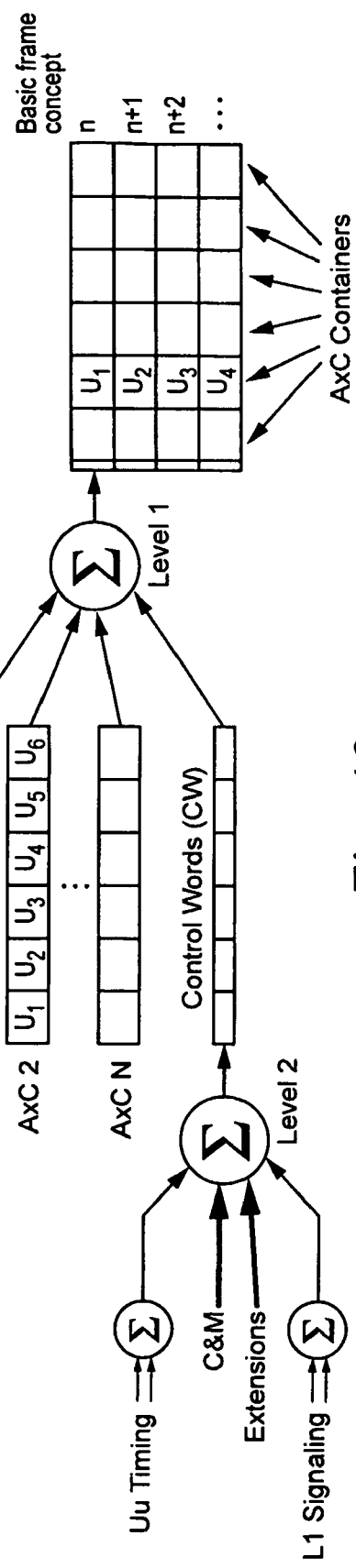
FIG. 12 shows conceptually how the framer/deframer in the REC and RE nodes multiplex both user information and control information into the frame structure.

The data control information are multiplexed together in the basic frame. FIG. 12 illustrates how multiple antenna carriers AxC 1 ... AxC N, each having multiple user data (IQ) samples $U_1$, $U_2$, . . . , etc., are multiplexed with a series of control words (CW) at a first multiplexing level 1. In turn, each control word corresponds to various control information which has been multiplexed onto the control word stream at a second multiplexing level 2. The control information includes timing, layer 1 (L1) signaling, C&M information, and extension information. This corresponds to the logical multiplexing of the different control flows shown in FIG. 5. Still further, the different timing information and different layer 1 signaling may be multiplexed at a third level 3. This corresponds to a logical multiplexing of the different information within the SYNC and L1 inband signaling 42 shown in FIG. 5. Multiplexing of different applications onto the C&M plane is not shown in FIG. 12.

To clearly define the multiplexers in FIG. 12, the control words (CW) are preferably organized into subchannels. The level 2 multiplexer operates on the subchannels, and each of the four inputs allocates one or more subchannels. In the example implementation, 64 subchannels are defined. Each subchannel includes every 64th control word (CW). The first CW in a hyperframe belongs to subchannel 0. Each subchannel has 4 CWs within a hyperframe (CW0-CW3). Subchannel 0 has a CW in basic frame numbers 0, 64, 128 and 192 within the hyperframe. Subchannel 63 has a CW in basic frame numbers 63, 127, 191 and 255 within the hyperframe.

Figure 13:
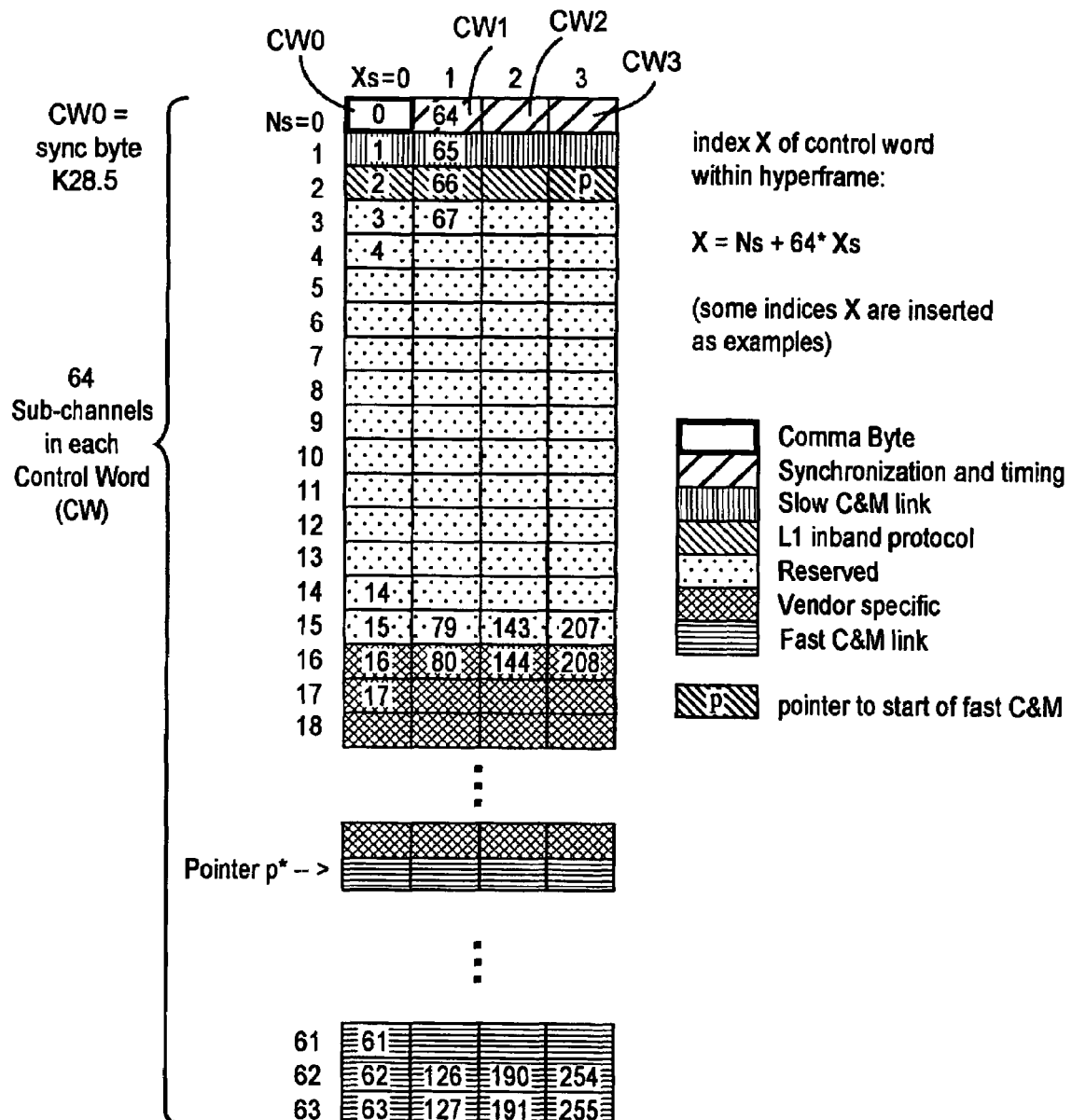
FIG. 13 illustrates an example control information subchannel structure used in one, non-limiting, example embodiment.

This CW organization of a hyperframe is shown in FIG. 13. The index for the subchannels ranges from 0 to 63. The index (Xs) of a control word within a subchannel has four possible values—0, 1, 2, and 3. The index of the control word within a hyperframe is given by the following equation: X=Ns+64*Xs, where Ns is the word number in the hyperframe. The level 3 multiplexer of FIG. 12 works on the CW level multiplexing up to four sub flows onto one subchannel. The sub flows can be allocated in increments of one CW per hyperframe. Also, the level 3 multiplexer is aligned with the hyperframe start to simplify demultiplexing at the receiving end.

Figure 14:
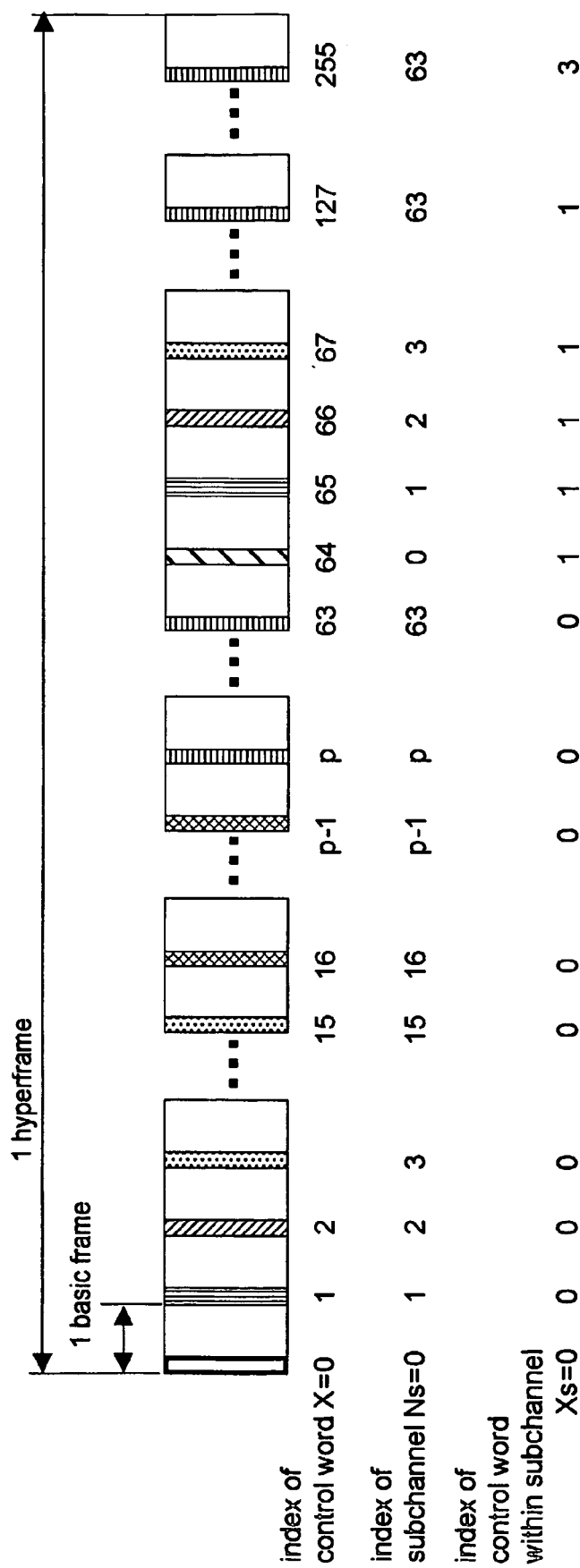
FIG. 14 illustrates control words and subchannels within one hyperframe in the one, non-limiting, example embodiment.

The organization of the control words in subchannels is illustrated in FIGS. 13 and 14. In FIG. 13, it is clear that the synchronization time mark, referred to in FIG. 13 as a sync byte, corresponds to the first control word/subchannel CW0 at Xs=0 and Ns=0. As described above, the synchronization and timing between the REC and the RE are achieved by the RE detecting the sync time mark contained in this control word. The time mark at the beginning of every hyperframe may be a unique but known symbol (an example is described below). Subchannel 1 includes the slow C&M link, where the slow C&M link is based on HDLC and has a bandwidth of 0.24, 0.48, or 0.96 Mbps at 1228.8 line bit rate. The slow C&M link includes HDLC frames carrying protocol layer L2+messages. Subchannel 2 includes layer 1 in-band protocol information including the interface version, the slow C&M link bit rate (if present), L1 control (e.g., reset of RE, SAP usage, etc.), the L1 status (signal presence and quality, end-point fault, etc.). The last control word of subchannel 2 includes a pointer "p" which points to the address/index of the start of fast C&M link, which in this example, is a subchannel number, somewhere in the range between 18 and 61. The slow C&M link includes Ethernet frames carrying L2+ messages. The fast C&M which uses Ethernet has a bandwidth of 0.96 mbps*N at 1.22.8 line bit rate, where N is the number of subchannels allocated. Subchannels 3-15 are reserved for frame or other uses, and subchannels 16 up through the pointer subchannel for the fast C&M include vendor-specific information. The vendor specific subchannels allow for add-ons to the protocol to achieve product differentiation. In addition to the sync byte, subchannel 0 also carries the hyperframe number (HFN in CW 1) and the node B Frame Number (BFN in CW 2 and CW3). The BFN identifies a radio frame in the radio signal sent over the air interface.

FIG. 14 illustrates control words and subchannels within one hyperframe. The BFN changes every 150 hyperframes/one radio frame. To quickly synchronize to the radio BFN frame structure, the hyperframe number (HFN) is transferred over the radio Uu interface. The RE can determine the radio interface (e.g., Uu) frame structure after receiving one hyperframe. The current BFN is transferred in whole, and the offset within the radio frame at the start of the received hyperframe is [HFN (received)/150] of a radio frame.

The L1 signaling transfers a Service access point Defect Indicator (SDI) bit or the like. The SDI bit indicates that higher protocol layers (L3 and above) are available and operational on the C&M link, synchronization link, and IQ data link. If the transmitting TDM framer in either the REC or the RE detects that at least one of the links is missing (a fault scenario), the SDI bit is set. Upon detecting a SDI bit, the receiving node stops interpreting the C&M, the synchronization, and IQ links and enters a "safe state." The fast signaling of a defective link is important because a faulty IQ link or synchronization link may cause transmission of radio signals that do not comply with regulatory requirements. A faulty C&M link may further hinder reconfiguration which in turn can also break such regulatory requirements. Of course, other indicators may be sent to accomplish one or more of these functions.

The TDM structure requires that both the transmitting node REC/RE and the RE/REC receiving node correctly know when a hyperframe starts. As a result, the receiving node must be able to detect the first basic frame of a hyperframe, the first octet or byte of the first basic frame, and the first bit of the first byte. All three synchronization levels are achieved by sending a unique, known symbol as the first word in a hyperframe. One example is a K28.5 symbol which is an 8B/10B code having a total of 10 bits. Two of those bits are redundant bits used for error detection and/or correction. Of course, other known symbols could be used. One-fourth of the control subchannel 0, namely, the first control word $X_0$ may be used to transfer the K28.5 symbol to reduce complexity. Using the K28.5 symbol, the RE achieves clock and data recovery. By initially transmitting the K28.5 symbol, the REC defines word borders in the hyperframe. If the receiving node loses data recovery during operation, additional K28.5 symbols are transferred. As a result, the CPRI interface is self-synchronizing on all levels without the need for feedback from the RE of clock and data recovery status. Nor are special actions needed to regain synchronization other than normal operation of the interface.

The start-up of the CPRI interface requires minimal start-up information at both the REC and RE nodes, i.e., start-up is plug-and-play. This is particularly desirable when radio base stations are deployed in large numbers. The start-up procedure must accomplish L1 synchronization bit alignment and hyperframe alignment. During start-up, the REC and the RE negotiate 3 interface characteristics: the line bit rate of the interface, the protocol revision, and the C&M link characteristics. Since there is no mandatory line bit rate or C&M link characteristics, the REC and RE must, during the start-up procedure, try different configurations until a common match is detected. The common match does not have to be optimal. Instead, the first common match permits an exchange of capabilities of a proper configuration to be used in the following communications.

Figure 15:
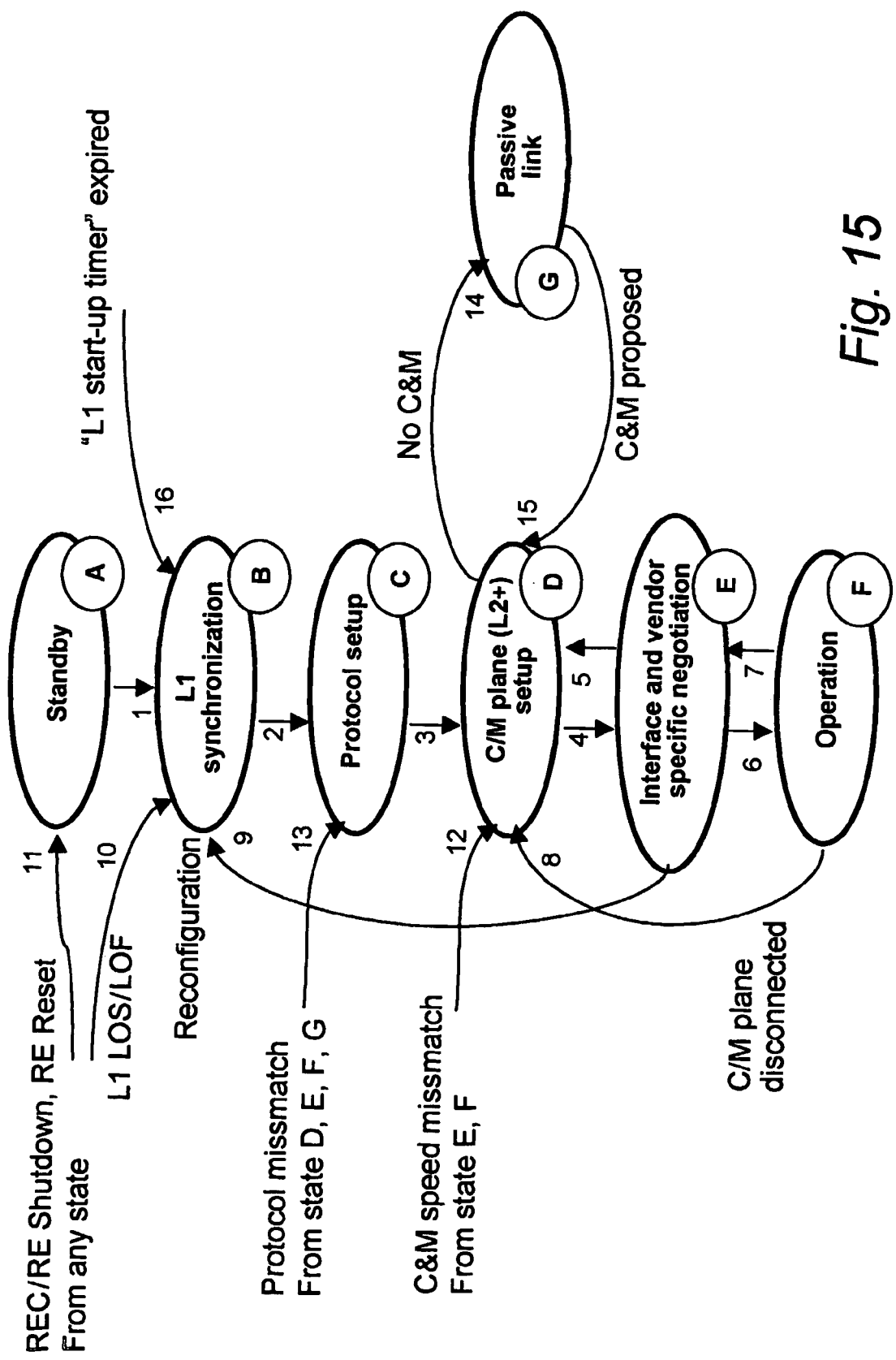
FIG. 15 is state diagram illustrating example start-up procedures between an REC and an RE.

FIG. 15 illustrates start-up state diagram showing various start-up states and transitions. During the stand-by state, there is no transmission or reception over the CPRI. An operator may designate a suitable start-up configuration including line bit rate, C&M link characteristics, etc. The REC and the RE may also have knowledge about a previous successful configuration. In state B, called "L1 synchronization, and rate negotiation," both REC and RE reach layer 1 (L1) synchronization, and the line bit rate of the interface is determined. The REC starts to transmit over the CPRI at the highest available bit rate when first entering the L1 synchronization state and also attempts to receive over the CPRI from the RE at the same line bit rate. If the REC does not reach synchronization, (i.e., the REC does not receive (1) K28.5 symbols at the proper repetition rate—1 per hyperframe—along with (2) an incrementing HFN), it selects another line bit rate after a time interval T1, where the time interval T1 may be, for example, 0.9-1.1 seconds. Following each T1 interval, a new line bit rate for reception and transmission is selected, assuming that one is available. The line bit rates may be selected from the available set in a round robin fashion, i.e., the first highest, the second highest, . . . , the slowest, and restarting from the highest line bit rate.

The RE attempts to receive over the CPRI at the highest available line bit rate when first entering the L1 synchronization state. If the RE does not each synchronization, (i.e., the REC does not receive K28.5 symbols at the proper repetition rate—1 per hyperframe—along with an incrementing HFN), it selects another line bit rate after a T1', where T1' may be, for example, between 3.9-4.1 seconds. Following each T1' interval, a new reception line bit rate selected for reception assuming that one is available. Again, the line bit rates may be selected from the available set in a round robin fashion. When the RE reaches synchronization, it starts to transmit over the CPRI interface to the REC at the same line bit rate that it successfully received at. At this point, layer 1 is synchronized with both uplink and downlink hyperframe structures aligned.

After successful completion of L1 synchronization and line bit rate negotiation, the next start-up state is protocol setup. During this state, a common protocol version of CPRI is determined. If one or both of the REC and RE can use multiple revisions of the CPRI interface, a common revision must be found before trying to extract the conveyed C&M link. Otherwise, the layer 1 signaling (and thus information about possible C&M links) cannot be interpreted. The REC and RE negotiate as follows: each node proposes the highest protocol revision that it supports. The node with the proposed highest revision steps back to the same revision as the other node (if possible) or proposes another revision, lower than the other node's (if possible). If one node proposes a revision lower than the lowest revision supported by the other node, no common protocol is available, and the start-up fails. If both nodes propose the same revision, the start-up proceeds using that proposed protocol revision.

After layer 1 synchronization and protocol version agreement, the start-up moves to state C&M plane (L2+) setup to determine a common C&M link bit rate. Negotiations proceed in parallel for the fast C&M link and the slow C&M link. For both links, each node proposes the fastest possible bit rate it supports, i.e., the fastest bit rate supported for fast C&M and the fastest bit rate supported for slow C&M. The unit with the highest proposed bit rate steps back to the bit rate proposed by the other node (if possible) or proposes another bit rate lower than that proposed by the other node (if possible). Of course, if no common C&M fast and slow bit rates are found, the start-up fails. If neither the fast or slow C&M link is set-up, the CPRI interface is a "passive link," which can be used in parallel with another interface with has a C&M link, e.g., when the C&M carrying interface does not have enough space for all AxCs to be transferred. The passive link state is shown in FIG. 15.

If the fast and slow C&M link speeds are agreed, the start-up proceeds to a vendor-specific negotiation state. During this state, the higher level applications in the REC and RE negotiate the CPRI usage. This specific information exchange about capabilities and capability limitations results in a preferred configuration of the CPRI based on a vendor-specific requirements. At this point, the start-up is complete and normal operation commences.

Figure 16:
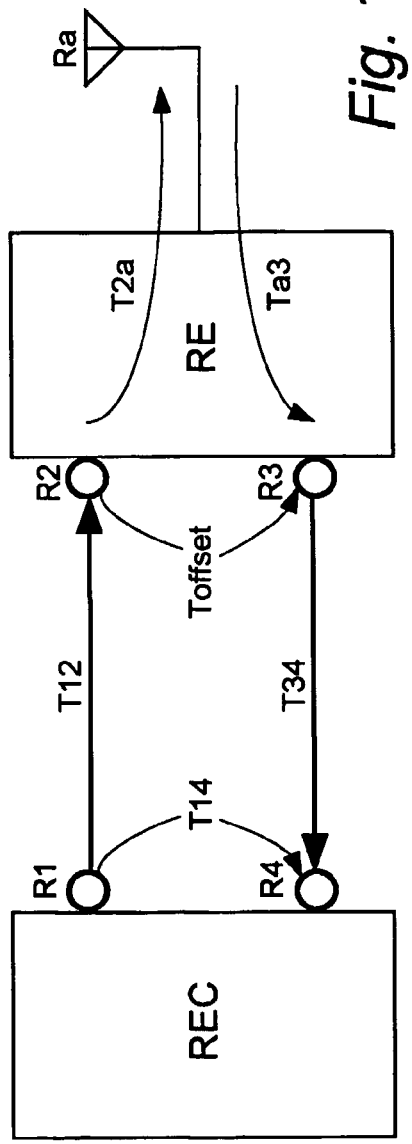
FIG. 16 is a diagram to identify various time delays and offsets between the REC and RE.

Related to synchronization is the issue of calibration/compensation for delays associated with the CPRI interface. The CPRI provides a mechanism to calibrate the delay between the REC and RE. Specific reference points for delay calibration and timing relationships between input and output signals at the REC and RE are defined as shown in FIG. 16. Reference points R1-R4 correspond to the output point of the REC (R1), the input of RE (R2), the output point of RE (R3), and the input point of REC (R4), respectively. The antenna is shown as "Ra" for reference.

Figure 17:
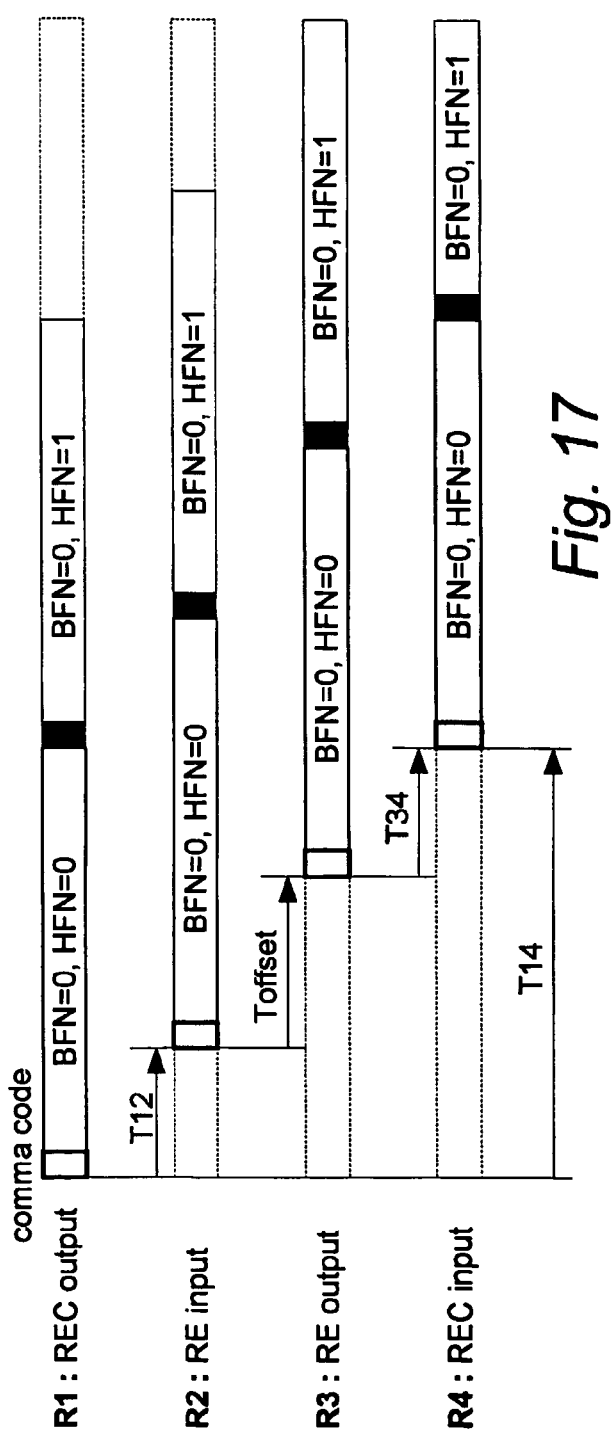
FIG. 17 shows the input and output information at each port shown in FIG. 16 in time.

FIG. 17 shows the relationship between downlink and uplink frame timing. T12 is the delay of the downlink signal from the output point of REC (R1) to the input point RE (R2). T34 is the delay of the uplink signal from the RE output point (R3) to the REC input (R4). Toffset is the frame offset between the RE input at R2 and the RE output signal at R3. T14 is the frame timing difference (the round trip delay), between the output signal at R1 and the input signal at R4.

The RE determines the frame timing of its output signal (uplink) to the fixed offset (Toffset) relative to the frame timing of its input signal (the downlink signal from REC). This fixed offset (Toffset) is an arbitrary value which is greater than or equal to 0 and less than $256*T_c$. Different REs may use different values for Toffset. In that case, the REC should know the Toffset value for each in advance, (e.g., a predefined value or RE informs REC by higher layer message). In addition, the downlink BFN and OFN from the REC to the RE are sent back uplink by the RE to the REC to remove ambiguity if the delay (T12+T34) is more than one hyperframe.

Assuming the CPRI interface delay in the uplink and downlink direction are equal, the interface delay can be determined by each node measuring the difference Toffset between the transmitted and received hyperframe structure. The RE reports the difference Toffset to the REC as Toffset RE. The round-trip delay can be calculated as follows: round-trip delay=Toffset REC-Toffset RE. The one-way delay is approximately one-half the round-trip delay. To simplify the delay measurement of long cables, (e.g., delay>one hyperframe/2), the RE generates its transmitted hyperframe number based on the received hyperframe number. The Toffset RE is therefore between 0 and 1 hyperframes long.

The invention can be practiced in a wide variety of implementations and embodiments, and is not limited to the CPRI example described above. Further details of this particular CPRI example implementation are provided in the CPRI specification v.1.0 (2003-09-30) described in the Swedish priority application, the contents of which are incorporated herein by reference.

While the description includes various example embodiments, it is to be understood that the claims are not to be limited to them. On the contrary, the claims are intended to cover various other embodiments, implementations, modifications, and equivalent arrangements.

What is claimed is:

1. A method for use in a radio base station for exchanging data between a radio equipment control (REC) node and a radio equipment (RE) node for transceiving information over a radio interface using multiple antenna carriers, the REC node being separate from and coupled to the RE node by a transmission link, comprising to steps of:
generating control information and user information for transmission over the transmission link from one of the REC node and the RE node to the other, the control information including multiple different control flows, each control flow corresponding to multiple control bits, and the user information including multiple data flows, each data flow corresponding to multiple data bits associated with one antenna for one radio carrier;
formatting the control information and user information into multiple time division multiplexed (TDM) frames, where each TDM frame has at least 256 bits and includes a control time slot for the multiple different control flows and multiple data time slots for the user information with each data time slot corresponding to a data flow of one of the antenna carriers, wherein the control information includes physical layer 1 (L1) signaling information that configures how to extract and interpret the multiple different control flows included in the control time slot; and
transmitting frames over the transmission link to the other node.

2. The method in claim 1, further comprising:
transceiving over the radio interface using code division multiple access (CDMA),
wherein a time period of the frame corresponds to one CDMA chip time period.

3. The method in claim 2, wherein the one CDMA chip time period is approximately or otherwise on the order of 260.42 nanoseconds.

4. The method in claim 3, wherein a rate of transmission over the transmission link is approximately or otherwise on the order of 614.4 Mbit/s.

5. The method in claim 3, wherein a rate of transmission over the transmission link is approximately or otherwise on the order of 1228.8 Mbit/s.

6. The method in claim 3, wherein a rate of transmission over the transmission link is approximately or otherwise on the order of 2457.6 Mbit/s.

7. The method in claim 1, wherein each antenna carrier has a corresponding time slot in the frame so that data samples for each antenna carrier are inserted in that antenna carrier's corresponding time slot, and wherein the corresponding time slot position in the frame is fixed.

8. The method in claim 1, wherein each antenna carrier has a corresponding time slot in the frame so that data samples for each antenna carrier are inserted in that antenna carrier's corresponding time slot, and wherein the corresponding time slot position in the frame can be changed.

9. The method in claim 1, wherein the different control flows includes four control flows: radio interface timing and synchronization information, control and management (C&M) information, layer 1 (L1) control information, and extension information.

10. The method in claim 9, wherein the control time slots are arranged into 64 subchannels, where each subchannel corresponds to every $64^{th}$ control time slot, and wherein the 64 subchannels are allocated to carry the four control flows.

11. The method in claim 1, further comprising:
combining 256 frames into a hyperframe, and
combining 150 hyperframes into a radio interface radio frame,
wherein the transmitting step includes transmitting radio frames over the radio interface.

12. The method in claim 11, wherein one or more borders of the hyperframe are used to map each control time slot to a respective assigned subchannel.

13. The method in claim 11, wherein each hyperframe includes 64 control words repeated four times in the hyperframe, each of the 64 control words corresponding to 64 subchannels, and wherein the 64 subchannels are allocated to carry the four control flows.

14. The method in claim 13, wherein each of four control words of a subchannel within a hyperframe carry one subflow of a control flow.

15. The method in claim 1, wherein the control information includes the L1 signaling and control and management (C&M) information, and wherein the L1 signaling is used to indicate a bit rate of the control and management (C&M) information.

16. The method in claim 15, wherein the C&M information includes fast C&M information and slow C&M information, and wherein the L1 signaling is used to indicate a bit rate of the fast C&M information and a bit rate of the slow C&M information.

17. The method in claim 1, wherein communications between the REC and the RE follow a communications protocol, and wherein the L1 signaling indicates a protocol version.

18. The method in claim 1, wherein the L1 signaling, communicates whether higher layers are available to process or provide control information.

19. The method in claim 18, wherein the L1 signaling transfers a service access indicator to indicate whether higher layers are operational for data, synchronization, or control and management (C&M).

20. The method in claim 1, wherein the control information includes a known symbol for use in obtaining synchronization between the REC and the RE.

21. The method in claim 20, wherein the synchronization includes clock and data recovery.

22. The method in claim 20, wherein the synchronization includes retrieving one or more hyperframe borders.

23. The method in claim 20, wherein the known symbol is periodically provided and the synchronization is obtained by the REC and the RE without requiring that a feedback signal be sent in response to the known symbol.

24. The method in claim 20, wherein the known symbol is a K28.5 symbol.

25. The method in claim 1, wherein at a start-up communication between the REC and the RE, the REC and RE negotiate one or more characteristics for the transmission link.

26. The method in claim 25, wherein the one or more characteristics includes one or more of the following: line bit rate, version of the transmission link interface, or one or more control and management (C&M) characteristics.

27. The method in claim 25, wherein the negotiation includes:
the REC sending transmissions over the interface, each transmission having one of multiple predetermined different line bit rates;
the RE attempting to detect the line bit rate of each such transmission; and
if the RE detects one of the REC transmissions, then the RE replies to the REC using the same line bit rate as used in the detected one REC transmission.

28. The method in claim 25, wherein the negotiation includes:
one or both of the REC and RE transmitting a highest, supported bit rate for one or more control and management (C&M) flows, and
the one of the REC and RE with a highest C&M bit rate adopts the highest bit C&M rate supported by the other or proposes a lower C&M bit rate.

29. The method in claim 25, wherein the negotiation includes:
one or both of the REC and RE transmitting a highest, supported version of the interface, and
the one of the REC and RE with a highest interface version, adopts the highest interface version supported by the other or proposes a lower interface version.

30. The method in claim 25, wherein the highest common interface version is adopted by both the REC and the RE and used for start-up of the interface at layers higher than layer one (L1).

31. The method in claim 1, further comprising:
determining a transmission time delay associated with the transmission link.

32. The method in claim 31, further comprising:
the RE obtaining an RE time difference between when a frame structure is received from the REC and when the frame structure is transmitted to the REC;
the REC determining an REC time difference between when a frame structure is received from the RE and when the frame structure is transmitted to the RE; and
determining a round trip delay by subtracting the RE time difference and the REC time difference.

33. A radio base station comprising:
a radio equipment controller (REC) portion;
a radio equipment (RE) portion including one or more antenna elements;
a communications link permitting communication between the REC and the RE;
a communications interface defining a communications protocol for the communications link;
wherein the REC includes:
a controller for providing control information and user information for transmission over the communications link to the RE, the control information including multiple different control flows, each control flow corresponding to multiple control bits, and the user information including multiple data flows, each data flow corresponding to multiple data bits associated with one antenna for one carrier;
a framer for formatting the control information and user information into multiple time division multiplexed (TDM) frames, where each TDM frame has at least 256 bits and includes a control time slot for the multiple different control flows and multiple data time slots for the user information with each data time slot corresponding to a data flow of one of multiple antenna carriers, wherein the control information includes physical layer 1 (L1) signaling information that configures how to extract and interpret the multiple different control flows included in the control time slot; and
a transmitter for transmitting frames over the communications link to the RE.

34. The radio base station in claim 33, wherein the RE includes:
transceiving circuitry for transceiving over the radio interface using code division multiple access (CDMA), and
wherein a time period of the frame corresponds to one CDMA chip time period.

35. The radio base station in claim 34, wherein the one CDMA chip time period is approximately or otherwise on the order of 260.42 nanoseconds.

36. The radio base station in claim 35, wherein a rate of transmission over the transmission link is approximately or otherwise on the order of 614.4 Mbit/s.

37. The radio base station in claim 35, wherein a rate of transmission over the transmission link is approximately or otherwise on the order of 1228.8 Mbit/s.

38. The radio base station in claim 35, wherein a rate of transmission over the transmission link is approximately or otherwise on the order of 2457.6 Mbit/s.

39. The radio base station in claim 33, wherein each antenna carrier has a corresponding time slot in the frame so that data samples for each antenna carrier are inserted in that antenna carrier's corresponding time slot, and wherein the corresponding time slot position in the frame is fixed.

40. The radio base station in claim 33, wherein each antenna carrier has a corresponding time slot in the frame so that data samples for each antenna carrier are inserted in that antenna carrier's corresponding time slot, and wherein the corresponding time slot position in the frame can be changed.

41. The radio base station in claim 33, wherein the different control flows includes four control flows: radio interface timing and synchronization information, control and management (C&M) information the (L1) control information, and extension information.

42. The radio base station in claim 33, wherein the control time slots are arranged into 64 subchannels, where each subchannel corresponds to every $64^{th}$ control time slot, and wherein the 64 subchannels may be allocated to carry the four control flows.

43. The radio base station in claim 42, wherein the framer is configured to:
combine 256 frames into a hyperframe, and
combine 150 hyperframes into a radio interface radio frame, and
wherein RE includes RF circuitry for transmitting radio-frames over the radio interface.

44. The radio base station in claim 43, wherein the framer is configured to use one or more borders of the hyperframe to map each control time slot to a respective assigned subchannel.

45. The radio base station in claim 43, wherein each hyperframe includes 64 control words repeated four times in the hyperframe, each of the 64 control words corresponding to 64 subchannels, and wherein the 64 subchannels are allocated to carry the four control flows.

46. The radio base station in claim 45, wherein each of four control words of a subchannel within a hyperframe carry one subflow of a control flow.

47. The radio base station in claim 33, wherein the control information includes control and management (C&M) information, and wherein the L1 signaling is used to indicate a bit rate of the control and management (C&M) information.

48. The radio base station in claim 47, wherein the C&M information includes fast C&M information and slow C&M information, and wherein the L1 signaling is used to indicate a bit rate of the fast C&M information and a bit rate of the slow C&M information.

49. The radio base station in claim 33, wherein communications between the REC and the RE follow a communications protocol, and wherein the control information includes layer 1 (L1) signaling which indicates a protocol version.

50. The radio base station in claim 33, wherein the L1 signaling communicates whether higher layers are available to process or provide control information.

51. The radio base station in claim 50, wherein the L1 signaling transfers a service access indicator to indicate whether higher layers are operational for data, synchronization, or control and management (C&M).

52. The radio base station in claim 33, wherein the control information includes a known symbol for use in obtaining synchronization between the REC and the RE.

53. The radio base station in claim 33, wherein the synchronization includes clock and data recovery.

54. The radio base station in claim 33, wherein the REC and RE each include synchronization circuitry for detecting one or more hyperframe borders.

55. The radio base station in claim 54, wherein the framer is configured to periodically provide a known symbol.

56. The radio base station in claim 55, wherein the known symbol is a K28.5 symbol.

57. The radio base station in claim 33, wherein at a start-up communication between the REC and the RE, the REC and RE include start-up circuitry configured to negotiate one or more characteristics for the transmission link.

58. The radio base station in claim 57, wherein the one or more characteristics includes one or more of the following: line bit rate, version of the transmission link interface, or one or more control and management (C&M) characteristics.

59. A radio equipment controller (REC) for use in radio base station that includes a radio equipment unit (RE) that has one or more antenna elements, a communications link permitting communication between the REC and the RE, and a communications interface defining a communications protocol for the communications link, the REC comprising:
  a controller for providing control information and user information for transmission over the communications link to the RE, the control information including multiple different control flows, each control flow corresponding to multiple control bits, and the user information including multiple data flows, each data flow corresponding to multiple data bits associated with one antenna for one carrier;
  a framer for formatting the control information and user information into multiple time division multiplexed (TDM) frames, where each TDM frame has at least 256 bits and includes a control time slot for the multiple different control flows and multiple data time slots for the user information with each data time slot corresponding to a data flow of one of multiple antenna carriers, wherein the control information includes physical layer 1 (L1) signal information that configures how to extract and interpret the multiple different control flows included in the control time slot; and
  a transmitter for transmitting frames over the communications link to the RE.

60. The REC in claim 59, wherein each antenna carrier has a corresponding time slot in the frame so that data samples for each antenna carrier are inserted in that antenna carrier's corresponding time slot, and wherein the corresponding time slot position in the frame is fixed.

61. The REC in claim 59, wherein each antenna carrier has a corresponding time slot in the frame so that data samples for each antenna carrier are inserted in that antenna carrier's corresponding time slot, and wherein the corresponding time slot position in the frame can be changed.

62. The REC in claim 59, wherein the different control flows includes four control flows: radio interface timing and synchronization information, control and management (C&M) information, layer 1 (L1) control information, and extension information.

63. The REC in claim 59, wherein the control information includes control and management (C&M) information, and wherein the L1 signaling is used to indicate a bit rate of the control and management (C&M) information.

64. The REC in claim 63, wherein the C&M information includes fast C&M information and slow C&M information, and wherein the L1 signaling is used to indicate a bit rate of the fast C&M information and a bit rate of the slow C&M information.

65. The REC in claim 59, wherein communications between the REC and the RE follow a communications protocol, and wherein the control information includes layer 1 (L1) signaling which indicates a protocol version.

66. The REC in claim 59, wherein the (L1) signaling communicating whether higher layers are available to process or provide control information.

67. The REC in claim 66, wherein the L1 signaling transfers a service access indicator to indicate whether higher layers are operational for data, synchronization, or control and management (C&M).

68. The REC in claim 59, wherein the control information includes a known symbol for use in obtaining synchronization between the REC and the RE.

69. The REC in claim 68, wherein the framer is configured to periodically provide a known symbol.

70. The REC in claim 59, wherein the REC includes start-up circuitry configured to negotiate one or more characteristics for the transmission link with the RE.

71. The REC in claim 70, wherein the one or more characteristics includes one or more of the following: line bit rate, version of the transmission link interface, or one or more control and management (C&M) characteristics.

72. A radio equipment node (RE) for use in radio base station that includes a radio equipment controller (REC), a communications link permitting communication between the REC and the RE, and a communications interface defining a communications protocol for the communications link, the RE comprising:
  radio transceiving circuitry coupled to one or more antenna elements;
  a controller for providing control information and user information for transmission over the communications link to the REC, the control information including multiple different control flows, each control flow corresponding to multiple control bits, and the user information including multiple data flows, each data flow corresponding to multiple data bits associated with one antenna element for one carrier;

a framer for formatting the control information and user information into multiple time division multiplexed (TDM) frames, where each TDM frame has at least 256 bits and includes a control time slot for the multiple different control flows and multiple data time slots for the user information with each data time slot corresponding to a data flow of one of multiple antenna carriers, wherein the control information includes physical layer 1 (L1) signaling information that configures how to extract and interpret the multiple different control flows included in the control time slot; and a transmitter for transmitting frames over the communications link to the REC.

* * * * *

UNITED STATES PATENT AND TRADEMARK OFFICE
CERTIFICATE OF CORRECTION

PATENT NO. : 7,646,751 B2 Page 1 of 1
APPLICATION NO. : 10/572367
DATED : January 12, 2010
INVENTOR(S) : Osterling et al.

It is certified that error appears in the above-identified patent and that said Letters Patent is hereby corrected as shown below:

On the Title Page, item (73), under "Assignees", in Column 1, Line 2, delete "Siemens AG" and insert -- Nokia Siemens Networks GMBH & Co. KG --, therefor.

On the Title Page, item (73), under "Assignees", in Column 1, Line 3, after "(DE)", insert -- , Nortel Network SA, Chateaufort (FR), NEC Corporation, Tokyo (JP), Huawei Technologies Co., Ltd., Shenzhen (CN) --.

In Column 2, Line 62, delete "information;" and insert -- information, --, therefor.

In Column 4, Line 43, delete "to," and insert -- to --, therefor.

In Column 14, Line 47, in Claim 18, delete "signaling," and insert -- signaling --, therefor.

In Column 16, Line 47, in Claim 41, delete "(L1)" and insert -- L1 --, therefor.

In Column 18, Line 2, in Claim 59, delete "signal" and insert -- signaling --, therefor.

In Column 18, Lines 35-36, in Claim 66, delete "(L1) signaling communicating" and insert -- L1 signaling communicates --, therefor.

Signed and Sealed this

Twenty-seventh Day of April, 2010

David J. Kappos
*Director of the United States Patent and Trademark Office*